United States Patent
Shinjo

(10) Patent No.: US 8,632,289 B2
(45) Date of Patent: Jan. 21, 2014

(54) TAPPING SCREW

(75) Inventor: Kimio Shinjo, Osaka (JP)

(73) Assignee: Pias Sales Co., Ltd., Osaka (JP)

( * ) Notice: Subject to any disclaimer, the term of this patent is extended or adjusted under 35 U.S.C. 154(b) by 286 days.

(21) Appl. No.: 13/152,354

(22) Filed: Jun. 3, 2011

(65) Prior Publication Data

US 2011/0305541 A1  Dec. 15, 2011

(30) Foreign Application Priority Data

Jun. 11, 2010  (JP) ................................ 2010-133541

(51) Int. Cl.
*F16B 25/10* (2006.01)

(52) U.S. Cl.
USPC ........................ 411/387.4; 411/412

(58) Field of Classification Search
USPC ............... 411/387.4, 411, 412, 424, 413, 426
See application file for complete search history.

(56) References Cited

U.S. PATENT DOCUMENTS

| | | | | |
|---|---|---|---|---|
| 1,827,615 A | * | 10/1931 | Rosenberg | 411/386 |
| 3,703,843 A | * | 11/1972 | Laverty | 411/413 |
| RE28,111 E | * | 8/1974 | Laverty | 411/412 |
| 4,194,430 A | * | 3/1980 | Muenchinger | 411/415 |
| 4,241,638 A | * | 12/1980 | Shimizu et al. | 411/386 |
| 5,061,136 A | * | 10/1991 | Dixon et al. | 411/412 |
| 5,294,227 A | * | 3/1994 | Forster et al. | 411/386 |
| 5,759,003 A | * | 6/1998 | Greenway et al. | 411/421 |
| 5,882,162 A | * | 3/1999 | Kaneko | 411/411 |
| 5,919,020 A | * | 7/1999 | Walther | 411/399 |
| 6,015,252 A | * | 1/2000 | Peck | 411/387.1 |
| 6,045,312 A | * | 4/2000 | Hsing | 411/412 |
| 7,090,453 B2 | * | 8/2006 | Lin | 411/387.1 |
| 2004/0228705 A1 | * | 11/2004 | Baer et al. | 411/424 |
| 2005/0069396 A1 | * | 3/2005 | Wu | 411/411 |
| 2006/0140738 A1 | * | 6/2006 | Lin | 411/186 |
| 2009/0169334 A1 | * | 7/2009 | Su | 411/412 |
| 2013/0011214 A1 | * | 1/2013 | Lin | 411/387.4 |

FOREIGN PATENT DOCUMENTS

| | | |
|---|---|---|
| JP | 48-13799 | 4/1973 |
| JP | 51-35847 | 3/1976 |
| JP | 54-53750 | 4/1979 |
| JP | 62-15769 | 4/1987 |

* cited by examiner

*Primary Examiner* — Roberta Delisle
(74) *Attorney, Agent, or Firm* — Antonelli, Terry, Stout & Kraus, LLP.

(57) ABSTRACT

Tapping screw (1) has conical portion (4) at the end of cylindrical portion (3) and thread (6) of tapered screw portion (M) disposed at conical portion (4) are formed of single-start threads roughly pitched, wherein the tip angle of conical portion (4) is conically formed at an acute angle of about 30 degrees, and second thread (7) extending in parallel with thread (6) of tapered screw portion (M) is disposed at the end of conical portion (4), forming double-start thread (6, 7) at the end of conical portion (4), and the axial length of tapered screw portion (T) formed of double-start thread (6, 7) is greater than the thickness (upper limit 1.6 mm) of the metal sheet to be fastened.

12 Claims, 5 Drawing Sheets

(a)

(b)

TAPPING SCREW

FIELD OF THE INVENTION

The present invention relates to a tapping screw used for screwing into a metal plate.

BACKGROUND ART

Conventionally, available as a tapping screw used for screwing directly into a metal plate without making a screw-hole is a tapping screw having a conical portion at the end thereof with a tip angle of 40 deg to 50 deg and formed of single-start threads roughly pitched, which is specified in JIS standards and commonly known.

However, the conventional tapping screw is only applicable for a thin steel sheet of less than 1.0 mm in thickness because of having no drill portion as in a drill screw and requiring a high torque for screwing the conical portion.

Accordingly, in order to enable screwing into a metal plate as thick as possible without making a screw-hole, various improvements are proposed such as those having double-start thread or triple-start thread, changed in thread shape, provided with protrusion to make the conical tip portion capable of cutting, and provided with a cutting edge (for example, refer to Patent Documents 1 to 4).

However, all of tapping screws of this type so far proposed are still only applicable for a thin steel sheet of less than 1.0 mm in thickness, and cannot be used for fastening a steel plate of over 1.0 mm in thickness or two steel sheets of 0.8 mm max. in thickness because of greater screwing resistance. Also, in the case of the one provided with a protrusion or cutting edge at the conical tip portion to make it capable of cutting, it is difficult to form by using a reversing device and there arises a problem in making it practically usable. Therefore, in case of fastening a steel plate of over 1.0 mm in thickness or two steel sheets of 0.8 mm max. in thickness, a drill screw having a drill portion at the screw end thereof is usually employed.

When securing a collar steel plate of roof material by using drill screws or fixing a draining portion, gutter, windbreak, signboard or the like on a wall steel plate, helical chips generated due to the cutting action of the drill screw remain without being carried away by the wind and rain, causing red rust to be generated, and as a result, it is sometimes required to remove them at the time of construction. Also, chips falling down in the building may affect the indoor environment depending upon the using purpose of the building. Accordingly, the development of technology that enables fastening by screwing without screw-hole causing no generation chips is expected.

Further, in an assembly line of the automobile industry, drill screws were tried, but it was rather avoided because helical chips generated due to the cutting action were scattered to electric wiring connections and others, causing damages to the electric system. Accordingly, if screwing without screw-hole causing no generation of chips is realized, it will bring about a new development in the automobile industry.

OUTLINE OF THE INVENTION

Problems to be Solved by the Invention

The present invention is intended to solve the problem described above. The object of the invention is to provide a tapping screw that enables fastening two steel sheets of 0.8 mm max. in thickness without generation of chips and also enables fastening even one steel plate of 1.6 mm max. in thickness without generation of helical chips.

Means to Solve the Problem

In order to solve the problem described, the present invention is a tapping screw having a conical portion at the end of a cylindrical portion with a head disposed at one end thereof, of which the thread of a parallel screw portion disposed at the cylindrical portion and the thread of a tapered screw portion disposed at the conical portion are formed of single-start threads roughly pitched, and the tip angle of the conical portion is conically formed at an acute angle of about 30 degrees, and a second thread extending in parallel with the thread of the tapered screw portion is disposed at the end of the conical portion, forming a double-start thread at the end of the conical portion, and the axial length of the tapered screw portion formed of the double-start thread is greater than the thickness (upper limit 1.6 mm) of the metal plate to be fastened.

The invention of claim 2 is characterized in that the double-start thread formed at the end of the conical portion comprises a drilling blade that increases in lead angle toward the tip of the conical portion and converges to the tip thereof.

The invention of claim 3 is characterized in that the angle of a flank surface on the tightening load side (head side) of the thread at the single-start parallel screw portion is smaller than the angle of the flank surface on the opposite side (conical portion side).

Effect of the Invention

The tapping screw of the present invention has roughly pitched single-start thread to reduce the screwing torque, while only the end of the conical portion is formed by double-start thread, and also, the axial length of the tapered portion having the double-start thread is greater than the thickness of the metal plate to be fastened, thereby drilling a V-shaped hole having a depth equivalent to the thickness of the metal plate to be fastened by means of the tip portion of the double-start thread rotated at a high speed and subsequently letting the double-start thread of the conical portion threadedly pierce into the V-shaped hole, and the peripheral portion of the through-hole is bent and deformed in a burring fashion. In this case, as specified in the invention of claim 2, the double-start thread formed at the end of the conical portion comprises a drilling blade that increases in lead angle toward the tip of the conical portion and converges to the tip thereof, and as a result, the V-shaped hole drilling, subsequent piercing and threading can be smoothly performed with smaller screwing forces.

Further, when the double-start thread of the conical portion threadedly pierces into the through-hole, the screwing resistance increases, but the thread of the conical portion changes to the single-start thread in the middle thereof, and it serves to halve the drilling resistance. And, the single-start thread of the parallel screw portion engages the bent and deformed inner periphery of the through-hole, making it possible to fasten the metal plate. In addition, since metal waste generated during drilling of the V-shaped hole is very slight and powder-like, it will be automatically removed by the wind and rain, requiring no special work for its removal.

Also, according to the invention of claim 3, the angle of the flank surface on the screw tightening load side (head side) at the single-start thread screw portion engaging the inner periphery of the bent and deformed through-hole is smaller than the angle of the flank surface on the opposite side (conical portion side), and it is possible to obtain a high holding force with respect to a thin metal plate.

DESCRIPTION OF THE PREFERRED EMBODIMENT

The preferred embodiment of the present invention will be described in detail in the following with reference to the drawings.

Figure 1:
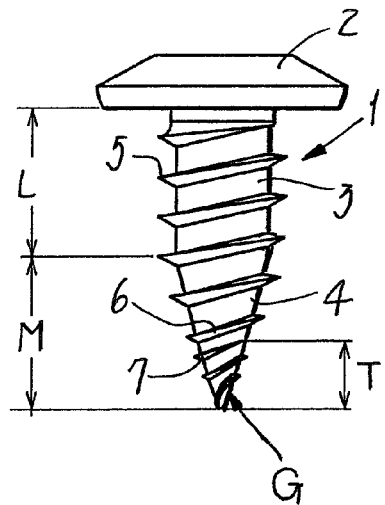
FIG. 1 is a front view of a tapping screw of the present invention.
Figure 2:
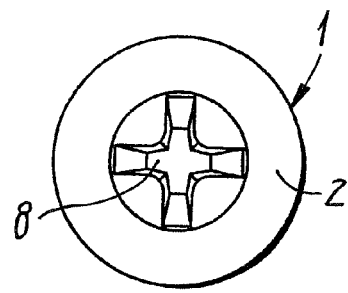
FIG. 2 is a plan view of the tapping screw.
Figure 3:
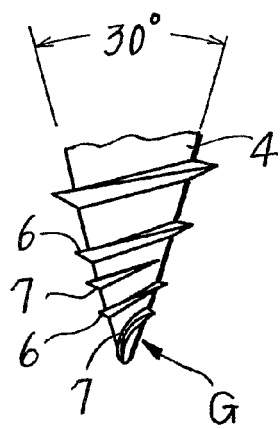
FIG. 3 is an enlarged front view of the tapered portion having double-start thread formed at the end of a conical portion of the tapping screw.
Figure 4:
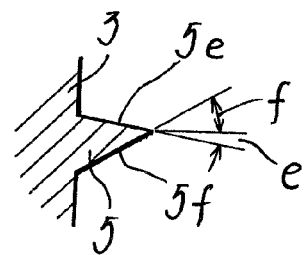
FIG. 4 is an enlarged sectional view of a thread of the parallel screw portion of the tapping screw.
Figure 5:
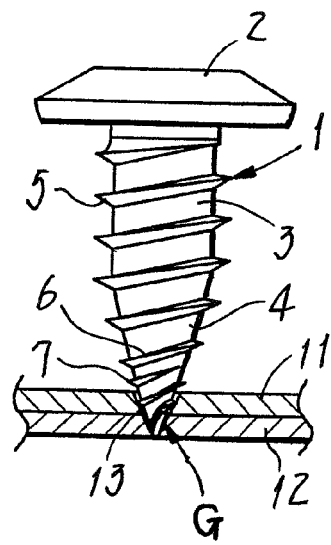
FIG. 5 is an explanatory view showing an example of use for fastening two shin steel sheets of 0.8 mm in thickness by means of the tapping screw of the present invention and also showing a state of initial machining by a tapered portion having double-start thread formed at the end of the conical portion.
Figure 6:
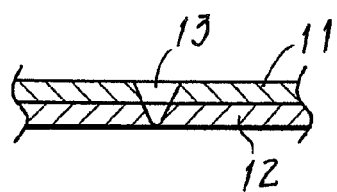
FIG. 6 is an explanatory view showing the V-shaped hole initially machined.
Figure 7:
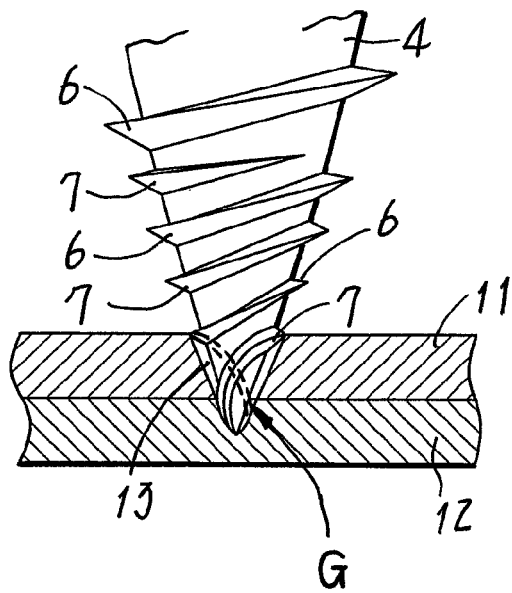
FIG. 7 is an explanatory view showing a state of initial machining: (a) shows a state of V-shape drilling by the tapered screw portion having double-start thread, and (b) shows a state of the tapered screw portion threadedly piercing into the V-shaped hole.
Figure 7:
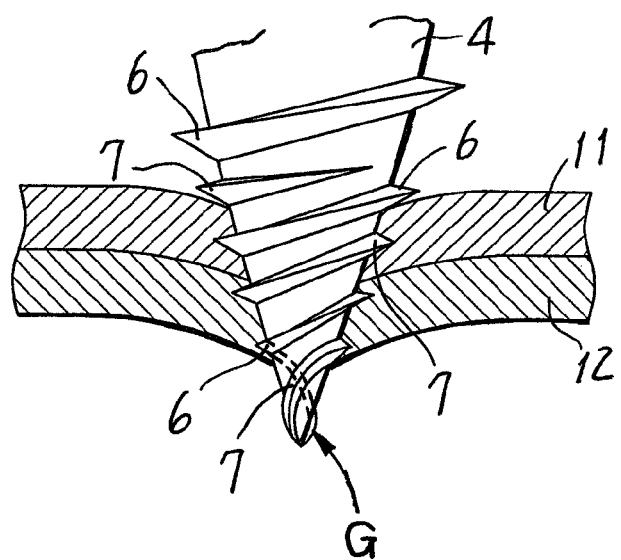

FIG. 1 and FIG. 2 show tapping screw 1 of the present invention. Tapping screw 1 has conical portion 4 at the end of cylindrical portion 3 with head 2 disposed at one end thereof, comprising roughly pitched single-start thread with thread 5 of parallel screw portion (L) disposed at cylindrical portion 3 connected to thread 6 of tapered screw portion (M) disposed at conical portion 4, and conical portion 4 is conically shaped at an acute angle of about 30 degrees in tip angle as shown in FIG. 3, and also disposed is second thread 7 extending to the end of conical portion 4 in parallel with thread 6 of tapered screw portion (M), forming double-start thread having thread 6 and thread 7 at the end of conical portion 4, and the axial length of tapered screw portion (T) having double-start thread 6, 7 is set greater than the thickness (upper limit 1.6 mm) of the metal plate to be fastened. And, double-start thread 6, 7 formed at the end of conical portion 4 comprises drilling blade G that increases in lead angle toward the tip of conical portion 4 and converges to the tip thereof. On the other hand, head 2 is provided with engagement hole 8 of a rotary tool. Further, as clearly shown in FIG. 4, angle e of flank surface 5e on the fastening load side (head side) of thread 5 of parallel screw portion (L) is smaller than angle f of flank surface 5f on the opposite side. Generally, angle f is 30 degrees, while angle e is set to 10 degrees. This is intended to increase the holding force of thread 5 with respect to the metal plate to be fastened as described later.

Tapping screw 1 having the above-mentioned configuration is quenched and hardened.

Figure 8:
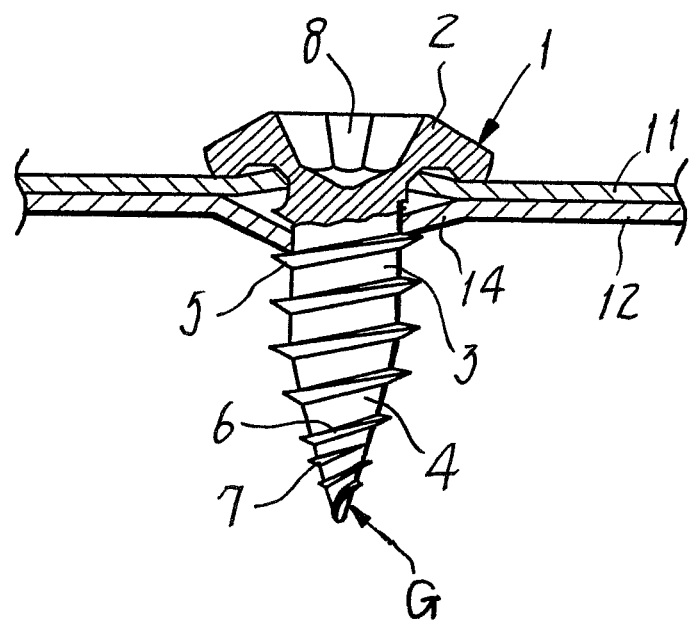
FIG. 8 is a sectional view of an essential portion showing a state of completion of fastening by the tapping screw.

FIG. 5 to FIG. 8 show an example of use for fastening two steel sheets 11, 12 of 0.8 mm in thickness by using tapping screw 1 of the present invention described above. As shown in FIG. 1, the axial length of tapered screw portion (T) having double-start thread 6, 7 is set greater than the thickness (1.6 mm) of two steel sheets 11, 12 to be fastened, and also, double-start thread 6, 7 comprises drilling blade G that increases in lead angle toward the tip of conical portion 4 and converges to the tip thereof, and thereby, V-shaped hole 13 having a depth equivalent to thickness (1.6 mm) is formed in two steel sheets 11, 12 by drilling with the tip portion of double-start thread 6, 7 [see FIG. 6 and FIG. 7 (a)]. Moreover, since metal waste generated during the drilling of V-shaped hole 13 is very slight and powder-like, it is scattered by the wind and there is no fear of generation of red rust. Subsequently, double-start thread 6, 7 threadedly engages V-shaped hole 13 and pierces through two steel sheets 11, 12, then the peripheral portion of the through-hole is widened, bent and deformed in a burring fashion by means of double-start thread 6, 7 and conical portion 4 [see FIG. 7 (b)]. When double-start thread 6, 7 of conical portion 4 threadedly engages the through-hole, the screwing resistance increases, but the thread of conical portion 4 changes to single-start thread 6 in the middle thereof, and it serves to halve the screwing resistance. And, thread 5 of parallel screw portion (L) continuous to the thread 6 engages peripheral portion 14 of the bent and deformed through-hole, thereby fastening two steel sheets 11, 12 as shown in FIG. 8. In this case, because flank surface 5e of thread 5 abutting to peripheral portion 14 of the through-hole is set to an angle (10 deg.) that is smaller than usual, the holding force of thread 5 with respect to steel sheets 11, 12 is increased and two steel sheets 11, 12 are securely fastened.

Figure 9:
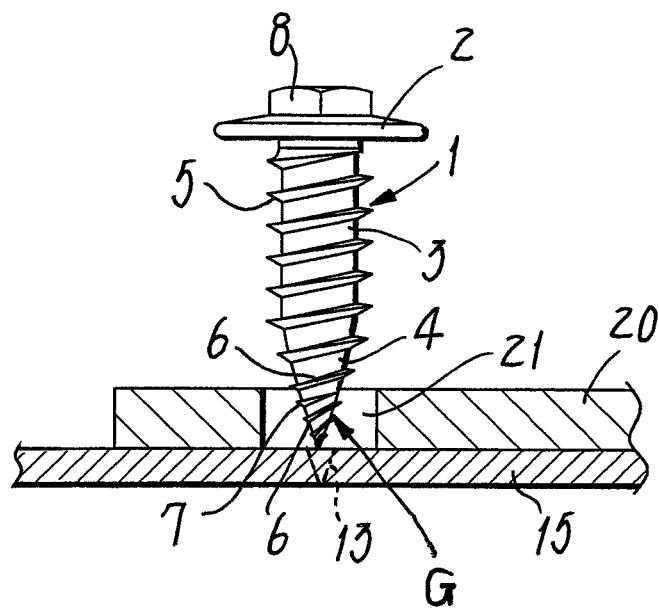
FIG. 9 is an explanatory view showing another example of using the tapping screw of the present invention.
Figure 10:
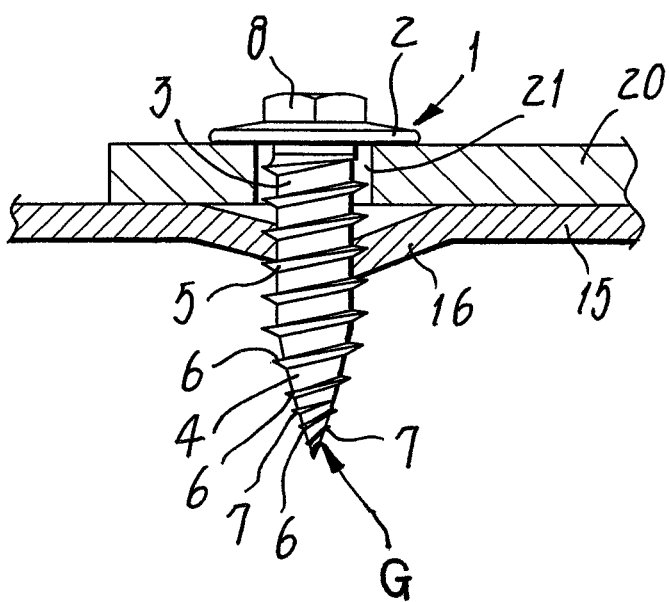
FIG. 10 is a sectional view of an essential portion showing a state of completion of fastening by the tapping screw.

FIG. 9 and FIG. 10 show an example of use for supporting and fixing member 20 formed with hole 21 on steel sheet 15 of 1.2 mm to 1.6 mm in thickness by using tapping screw 1 of the present invention. Same as in the preferred embodiment sown in FIG. 5 to FIG. 8, the axial length of tapered screw portion (T) having double-start thread 6, 7 formed at the end of conical portion 4 is set greater than the thickness (1.2 mm to 1.6 mm) of steel sheet 15 to be fastened, and drilling of V-shaped hole 13 having a depth equivalent to the thickness of steel sheet 15 is realized by drilling blade G formed at the end of double-start thread 6, 7. Subsequently, double-start thread 6, 7 threadedly pierces through steel sheet 15, then the peripheral portion of the through-hole is widened, bent and deformed in a burring fashion by means of double-start thread 6, 7 and conical portion 4, and also, thread 5 of parallel screw portion (L) continuous to thread 6 engages peripheral portion 16 of the bent and deformed through-hole, which is then fastened to steel sheet 15 as shown in FIG. 10, and thereby, member 20 is supported and fixed on steel sheet 15.

DESCRIPTION OF THE REFERENCE NUMERALS AND SIGNS

1 Tapping screw
2 Head
3 Cylindrical portion
4 Conical portion
5 Thread of parallel screw portion (L)
6 Thread of tapered screw portion (M)
7 Second thread extending in parallel with thread 6
G Drilling blade formed at the end of double-start thread 6, 7
8 Engagement portion of rotary tool
L Parallel screw portion
M Tapered screw portion
T Tapered screw portion having double-start thread 6, 7

11, 12, 15 Steel sheet
13 V-shaped hole
14, 16 Peripheral portion of through-hole
20 Member
21 Hole

PRIOR ART DOCUMENTS

Patent Documents

[Patent document 1] Japanese Utility Model Publication S48-13799
[Patent document 2] Japanese Patent Unexamined Publication S54-53750
[Patent document 3] Japanese Patent Publication S62-15769
[Patent document 4] Japanese Patent Unexamined Publication S51-35847

The invention claimed is:

1. A tapping screw comprising:
a cylindrical portion;
a head disposed on one end of the cylindrical portion;
a conical portion disposed on an opposite end of the cylindrical portion, and an end of the conical portion forming a tip of the tapping screw;
a thread of a parallel screw portion disposed on the cylindrical portion, and a thread of a tapered screw portion disposed on the conical portion, wherein the thread of the tapered screw portion extends to the tip of the tapping screw, and the thread of the parallel screw portion is connected to, and continuous with, the thread of the tapered screw portion;
a second thread extending in parallel with the thread of the tapered screw portion, wherein the second thread extends to the tip of the tapping screw, the second thread and the thread of the tapered screw portion form a double-start thread along the tapered screw portion, and the double-start thread is disposed only on the conical portion.

2. The tapping screw of claim 1, wherein a tip angle of the conical portion is conically formed at an acute angle of about 30 degrees.

3. The tapping screw of claim 1, wherein an axial length of the tapered screw portion having the double-start thread is greater than a thickness of a metal plate to be fastened.

4. The tapping screw of claim 1, wherein the double-start thread disposed on the conical portion comprises a drilling blade that increases in lead angle toward the tip the tapping screw and converges toward the tip of the tapping screw.

5. The tapping screw of claim 1, wherein the thread of the parallel screw portion and the thread of the tapered screw portion are formed of single-start threads roughly pitched.

6. A tapping screw having a conical portion at an end of a cylindrical portion with a head disposed at one end thereof, of which a thread of a parallel screw portion disposed at the cylindrical portion and a thread of a tapered screw portion disposed at the conical portion are formed of single-start threads roughly pitched,
wherein a tip angle of the conical portion is conically formed at an acute angle of about 30 degrees, and a second thread extending in parallel with the thread of the tapered screw portion is disposed at a tip end of the conical portion, a double-start thread is formed at the tip end of the conical portion, and the axial length of the tapered screw portion having the double-start thread is greater than the thickness of a metal plate to be fastened.

7. The tapping screw of claim 6, wherein the double-start thread formed at the tip end of the conical portion comprises a drilling blade that increases in lead angle toward a tip of the conical portion and converges to the tip thereof.

8. The tapping screw of claim 7, wherein an angle of a flank surface on the fastening load side of the thread at the single-start parallel screw portion is smaller than an angle of a flank surface on the opposite side.

9. The tapping screw of claim 6, wherein an angle of a flank surface on the fastening load side of the thread at the single-start parallel screw portion is smaller than an angle of a flank surface on the opposite side.

10. The tapping screw of claim 6, wherein an end of the thread of the tapered screw portion is disposed at the tip end of the conical portion.

11. The tapping screw of claim 10, wherein the double-start thread is formed of the thread of the tapered screw portion and the second thread.

12. The tapping screw of claim 6, wherein the double-start thread is formed of the thread of the tapered screw portion and the second thread.

* * * * *